INVENTORS
ROBERT P. KAPP
CHARLES W. KNISELY
BY
ATTORNEYS

April 11, 1950 R. P. KAPP ET AL 2,503,442
GREASE LUBRICATED JOURNAL BEARING WITH DEFLECTORS
Filed Dec. 3, 1948 2 Sheets-Sheet 2

INVENTORS
ROBERT P. KAPP
CHARLES W. KNISELY
BY Daniel Stryker
J. H. Grahame
ATTORNEYS Patented Apr. 11, 1950

2,503,442

UNITED STATES PATENT OFFICE 2,503,442

GREASE LUBRICATED JOURNAL BEARING WITH DEFLECTORS

Robert P. Kapp, State College, and Charles W. Knisely, Pine Grove Mills, Pa., assignors, by mesne assignments, to The Texas Company, New York, N. Y., a corporation of Delaware Application December 3, 1948, Serial No. 63,402

10 Claims. (Cl. 308—36.5)

This invention relates to a journal bearing, and particularly to a grease-lubricated plain journal bearing.

One of the principal objects of the invention is to provide an improved grease-lubricated journal bearing wherein friction-producing washers and packing are eliminated, and at the same time end leakage of lubricant from the bearing is effectively prevented.

Another object of the invention is to provide a bearing of this character equipped with grease deflectors designed to promote grease recirculation within the bearing to increase the effective arc of lubricating film on the bearing, and prevent end leakage therefrom, thereby affording more efficient operation of the bearing with decreased grease consumption.

Still another object of the invention is to provide a novel grease deflector for a bearing of this character.

Other objects and advantages of the invention will be apparent from the following description, the accompanying drawing and the appended claims.

Referring to the drawing, which discloses a preferred embodiment of the invention:

Figure 1:
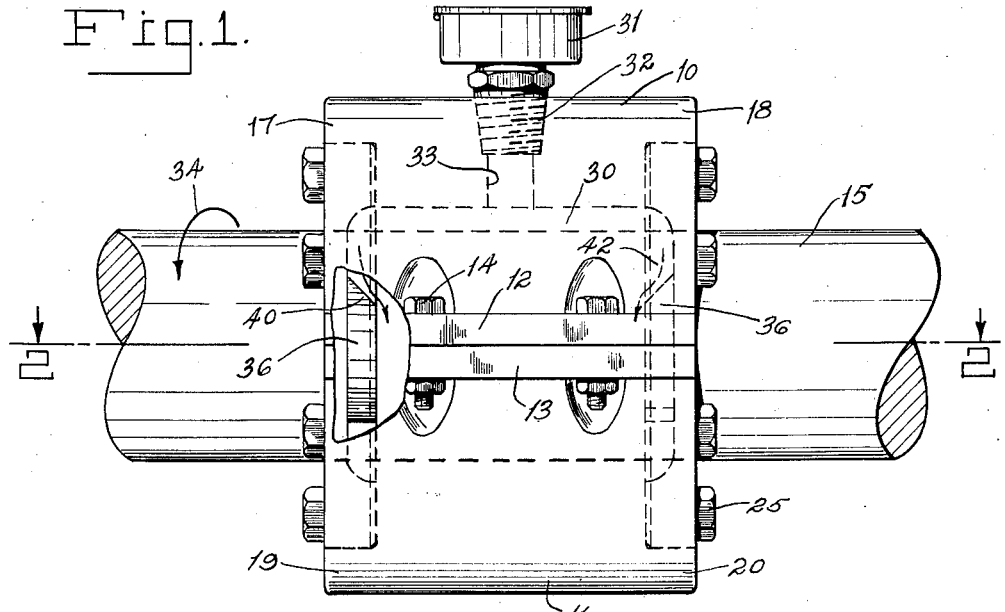
Fig. 1 is a front elevational view of the journal bearing with parts broken away and in section to illustrate the construction thereof.

The bearing is providing with an upper housing member 10 and a lower housing member 11 equipped with side flanges 12 and 13, respectively, receiving bolts 14 which clamp the housing members securely in place about the journal 15. Both the upper and lower housing members are provided at opposite ends thereof with peripheral flanges or extensions indicated at 17 and 18, for the upper member 10, and at 19 and 20 for the lower member 11. In the annular space thus formed about journal 15 at each end of the bearing is bolted an end seal ring 22.

Figure 2:
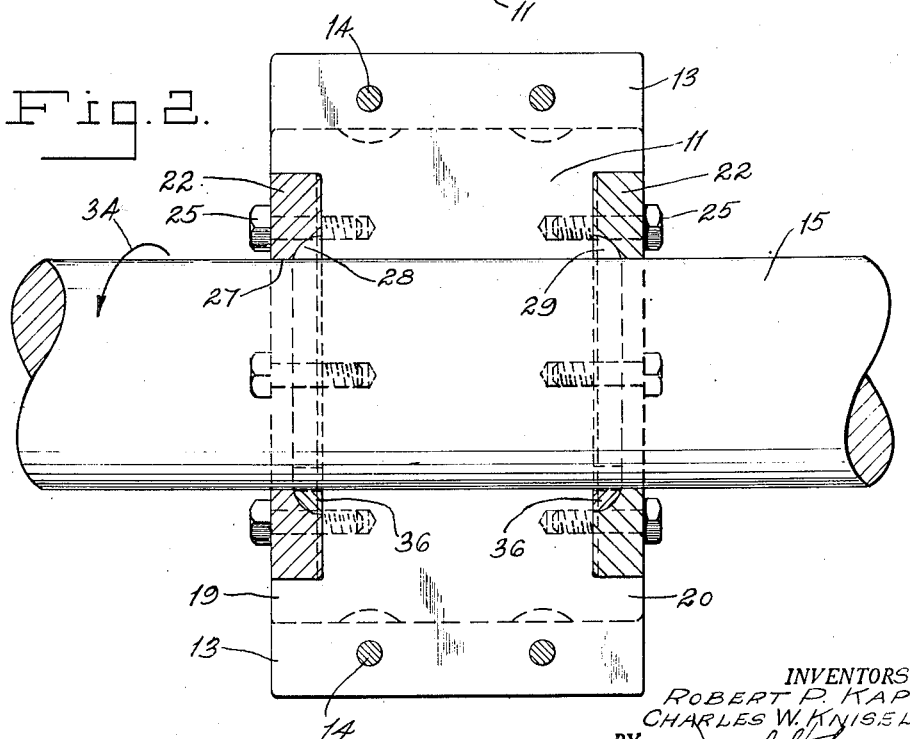
Fig. 2 is a horizontal sectional view taken on the plane of the line 2—2 of Fig. 1.

Both end seal rings are of identical construction, and merely face oppositely at the opposite ends of the bearing. One of the seal rings is illustrated in elevation in Fig. 3, being provided with a flat facing surface 24 which abuts against the inner side of the housing member when fastened in place by the bolts 25, the latter passing through holes 26 in the seal rings and threaded into sockets in the housing member. The outer flat periphery of each seal ring fits snugly against the side flanges 17, 19 and 18, 20 of the housing members (Figs. 1 and 2). In addition, each end ring has a flat inner surface 27 (Fig. 2) having a snug but substantially frictionless fit about journal 15. The flat inner surface 27 is connected by a curved concave surface 28 with the flat facing surface 24, thereby providing an annular groove 29, which is quarter-round in cross section, about the journal 15 at each end of the bearing.

As shown in Fig. 1, the upper housing member 10 is spaced away from the top of the journal 15 to form a grease receiving pocket 30 extending throughout the length of the bearing and connecting with the annular channels 29 at the opposite ends thereof. The upper housing member is also provided with a conventional grease feed cup 31 which is threaded at 32 into a socket communicating with a vertical feed channel 33 that opens into the pocket 30.

Figure 3:
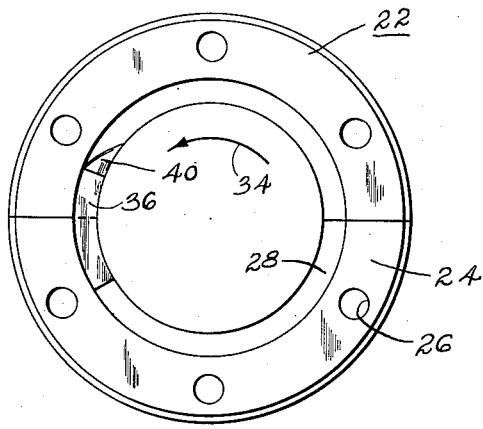
Fig. 3 is a side elevational view of the inner side of an end seal ring removed from the bearing, with the deflector in place therein.
Figure 5:
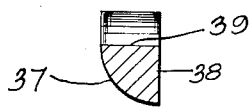
Fig. 5 is a horizontal sectional view taken on the plane of the line 5—5 of Fig. 4.

The direction of rotation of the journal 15 is as shown by the arrows 34 in Figs. 1, 2 and 3. Mounted in each of the annular grooves 29 at the "on" side of the bearing, that is the side facing the downward direction of movement of the journal 15, is a grease deflector indicated generally at 36. The construction of each grease deflector is shown more particularly in Figs. 4–6, and comprises a bar which is quarter-round in cross section (Fig. 5), having a curved surface 37 adapted to be received by the curved surface 28 of its associated end ring, a flat surface 38 adapted to bear against the side wall of the upper and lower housing members 10 and 11, and a flat surface 39 adapted to engage the journal 15. In the particular embodiment shown, the bar is of proper size to fill the annular channel 29 and to be clamped firmly in fixed position against the housing members when the bolts 25 for the respective end ring 22 are drawn tight. At the same time the surface 39 of the bar is snugly held in lubricated engagement with the journal 15.

While the particular construction illustrated, wherein each deflector fills its annular channel and is clamped firmly between its end seal ring and the housing members, has been found to function very satisfactorily, it is to be understood that the invention is not limited thereto. Thus each deflector may be constructed slightly smaller in size than the annular channel so as to have some small degree of freedom of movement within the channel both axially and radially of the journal, while at the same time movement circumferentially of the journal is restricted by cooperating lugs or stops on the deflector and end ring or housing members respectively, or by other suitable means for retaining the deflector in desired position at the on side of the bearing. Also, in such case, each deflector may be spring pressed, as by leaf spring, toward the journal so as to be capable of assuming and maintaining its best running clearance with respect to the shaft.

Figure 4:
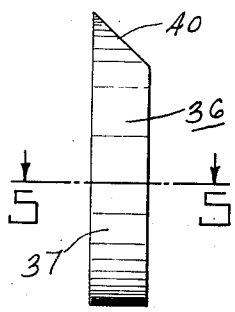
Fig. 4 is a side elevational view of one of the deflectors.
Figure 6:
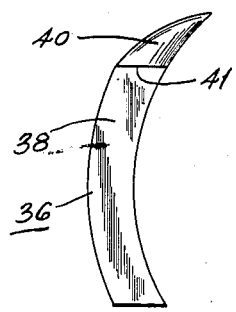
Fig. 6 is a side elevational view of the deflector taken at right angles to Fig. 4.

As shown more clearly in Figs. 4 and 6, the upper end of each bar is tapered as indicated at 40, the taper extending downwardly from the juncture of the quarter-round surface 37 with the flat surface 39 which contacts the journal. Thus the taper ends at the line 41 (Fig. 6) which indicates the juncture of the taper with the flat surface 38 which bears against the housing members. As shown in Figs. 1 and 3, the deflectors are each mounted with the taper 40 at the upper end thereof and facing toward the center of the bearing, that is, inclined downwardly from the highest surface adjacent the outer edge of annular groove 29 to the lowest point of the taper adjacent the inner edge of said groove 29. This construction is such that grease carried on the surface of the journal 15 opposite each of the grooves 29 is scraped from the journal at the on side of the bearing and directed by the taper 40 back toward the center of the bearing. This action is best accomplished by having each deflector extend less than 90° around the journal 15 at the on side of the bearing with portions of the deflector extending both above and below the horizontal plane of the journal axis. Preferably, each deflector extends above the horizontal plane of the journal axis about 30–45° and extends below the horizontal plane of the journal axis about 20–45°, with the taper of the upper inclined end 40 being about 10–20° in extent. By way of example, very satisfactory results have been secured with deflectors of this type in which each deflector extends above the horizontal plane of the journal axis about 37° and below that horizontal plane about 32°, with an upper taper of about 17° in extent. The grease deflection toward the center of the bearing is indicated by the arrows 42 in Fig. 1.

In operation, the weight of journal 15 is, of course, carried primarily by the bearing surface of the lower housing member 11; and this tends to squeeze the lubricant outwardly from the center toward the grooves 29 at opposite ends of the bearing. The grease adhering to the surface of the rotating journal 15 is carried around to the on side of the bearing where it contacts the deflectors 36. The taper 40 then forces the grease scraped from the journal surface toward the center of the bearing. A recirculation of the grease within the bearing proper is thereby set up which serves to maintain a larger arc of fluid film lubrication between the journal 15 and the lower bearing surface of the housing member 11, and also maintain an unbroken lubricating film for a longer period of time without replenishment of grease from feed cup 31. At the same time, end leakage of grease from the bearing is effectively restrained, providing improved grease consumption. And of greater importance, the frictional resistance of the bearing is substantially less than that of the conventional type equipped with sealing washers or gaskets which bear in frictional engagement with the journal 15.

Obviously many modifications and variations of the invention as above set forth may be made without departing from the spirit and scope thereof, and therefore only such limitations should be imposed as are indicated in the appended claims.

We claim:

1. A grease-lubricated plain journal bearing comprising in combination, upper and lower bearing housing members, a journal rotatively mounted therein, said upper bearing housing member being spaced from the upper portion of said journal to provide a grease receiving pocket therebetween, means carried by said upper bearing housing member to supply said pocket with a lubricating grease, annular end seal rings clamped against the opposite ends of said bearing housing members with a snug but substantially frictionless fit about said journal, each of said end seal rings being spaced on the inner side thereof from said housing members and said journal to form an annular groove surrounding said journal, and grease deflectors, one within each groove, mounted between said seal rings and housings at the on side of said journal, each deflector bearing against said journal and having an inclined upper surface adapted to deflect grease scraped from said journal toward the center of said bearing.

2. A grease-lubricated plain journal bearing according to claim 1, wherein each deflector has an arcuate-shaped flat surface to bear against the journal for an extent less than 90° around the latter, the deflector extending both above and below the horizontal plane of the journal axis at the on side of the journal.

3. A grease-lubricated plain journal bearing according to claim 2, wherein each deflector extends above the horizontal plane of the journal axis about 30–45° and extends below the horizontal plane of the journal axis about 20–45°, the taper of the upper inclined end being about 10–20° in extent.

4. A grease-lubricated plain journal bearing comprising in combination, upper and lower bearing housing members having complementary semi-cylindrical bearing surfaces, a journal rotatively mounted therein; said housing members having engaging surfaces detachably clamped together at opposite sides of the journal and substantially in the horizontal plane of the journal axis, the bearing surface of said upper housing member being cut away to provide a grease receiving pocket opposite the upper portion of said journal, means carried by said upper housing member to supply said pocket with a lubricating grease, outwardly extending peripheral flanges carried by said housing members at opposite ends thereof, annular end seal rings clamped against the opposite ends of said housing members within said peripheral flanges with a snug but substantially frictionless fit about said journal, each of said end seal rings being spaced on the inner side thereof from said housing members and said journal to form an annular groove surrounding said journal, and grease deflectors, one within each groove, mounted between said seal rings and housings at the on side of said journal, each deflector bearing against said journal and having an inclined upper surface adapted to deflect grease scraped from said journal toward the center of said bearing.

5. A grease-lubricated plain journal bearing according to claim 4, wherein each end seal ring has a curved deflector-receiving surface, and each deflector has a correspondingly curved surface seating against the said curved surface of its associated end seal ring, a flat surface lying in a single plane seating against said housing members, and a flat surface of arcuate shape bearing against said journal.

6. A grease-lubricated plain journal bearing according to claim 5, wherein each deflector extends both above and below the horizontal plane of the journal axis, the total extent of the deflector around the journal being less than 90°.

7. A grease-lubricated plain journal bearing according to claim 6, wherein each deflector extends above the horizontal plane of the journal axis about 30–45° and extends below the horizontal plane of the journal axis about 20–45°, the taper of the upper inclined end being about 10–20° in extent.

8. A grease-lubricated plain journal bearing according to claim 7, wherein each deflector is quarter-round in cross-section, the taper extending downwardly from the juncture of the quarter-round surface with the flat surface which contacts the journal.

9. A grease-lubricated journal bearing comprising, in combination, a bearing housing structure including upper and lower bearing housing members detachably fastened together, a journal rotatably mounted therein, said parts providing a grease receiving chamber on the immediate exterior of the upper side of said journal within the housing, and also annular grooves about the journal adjacent opposite ends of the housing, and grease deflectors mounted within said annular grooves so as to contact said journal at the on side of said journal, each grease deflector extending not more than 90° around the journal and positioned so as to extend both above and below the horizontal plane of the journal axis, the upper end of each deflector being inclined so as to deflect grease scraped from said journal toward the center of the bearing.

10. A grease deflector for a grease-lubricated journal bearing, comprising a bar which is substantially quarter-round in cross section with its quarter-round surface joined by two flat surfaces which are substantially perpendicular to each other, one of said flat surfaces being arcuate-shaped in length, the other of said flat surfaces lying in a single plane, one end of said bar being tapered to a point at the junction of said quarter-round surface with said arcuate-shaped flat surface.

ROBERT P. KAPP.
CHARLES W. KNISELY.

REFERENCES CITED

The following references are of record in the file of this patent:

UNITED STATES PATENTS

| Number | Name | Date |
|---|---|---|
| 1,178,231 | Guetl | Apr. 4, 1916 |
| 1,316,707 | Goodrich | Sept. 23, 1919 |